(12) United States Patent
Suzuki et al.

(10) Patent No.: US 8,304,503 B2
(45) Date of Patent: Nov. 6, 2012

(54) PROCESS FOR PRODUCING CONJUGATED DIENE POLYMER

(75) Inventors: Michinori Suzuki, Chiba (JP); Koji Shiba, Chiba (JP); Masato Murakami, Chiba (JP)

(73) Assignee: Ube Industries, Ltd. (JP)

( * ) Notice: Subject to any disclaimer, the term of this patent is extended or adjusted under 35 U.S.C. 154(b) by 0 days.

(21) Appl. No.: 13/133,547

(22) PCT Filed: Dec. 25, 2009

(86) PCT No.: PCT/JP2009/071652
§ 371 (c)(1),
(2), (4) Date: Jul. 7, 2011

(87) PCT Pub. No.: WO2010/074255
PCT Pub. Date: Jul. 1, 2010

(65) Prior Publication Data
US 2011/0263803 A1 Oct. 27, 2011

(30) Foreign Application Priority Data

Dec. 25, 2008 (JP) ................................. 2008-329287
Dec. 25, 2008 (JP) ................................. 2008-329288
Mar. 24, 2009 (JP) ................................. 2009-071280
Nov. 13, 2009 (JP) ................................. 2009-259383

(51) Int. Cl.
*C08F 4/44* (2006.01)
*C08F 136/06* (2006.01)

(52) U.S. Cl. ..... 526/164; 526/127; 526/133; 526/340.4; 502/102; 502/154; 502/171

(58) Field of Classification Search ............... 526/127, 526/133, 164, 340.4; 502/158, 171, 102, 502/154
See application file for complete search history.

(56) References Cited

U.S. PATENT DOCUMENTS

| | | | | |
|---|---|---|---|---|
| 6,284,697 B1* | 9/2001 | Windisch et al. | ............. | 502/102 |
| 2009/0105401 A1* | 4/2009 | Suzuki et al. | ................. | 524/526 |

FOREIGN PATENT DOCUMENTS

| | | |
|---|---|---|
| JP | 07-070143 | 3/1995 |
| JP | 07-268013 | 10/1995 |
| JP | 2002-256012 | 9/2002 |
| JP | 2004-027179 | 1/2004 |
| JP | 2007-161918 | 6/2007 |
| JP | 2007-161919 | 6/2007 |
| JP | 2007-161920 | 6/2007 |
| WO | 2006/049016 A1 | 5/2006 |

OTHER PUBLICATIONS

Machine translation of JP 2007-161918; publication date: Jun. 2007.*

* cited by examiner

*Primary Examiner* — Fred M Teskin
(74) *Attorney, Agent, or Firm* — Clark Hill PLC

(57) ABSTRACT

Disclosed is a process for producing a conjugated diene polymer having a very high content of cis-1,4 structures by using an yttrium compound-containing catalyst that is relatively easy to handle and has a high activity. Specifically disclosed is a process for producing a conjugated diene polymer containing cis-1,4 structures at a ratio of 99% or higher, which is characterized by polymerizing a conjugated diene in the presence of a catalyst produced from (A) a specific yttrium compound, (B) an ionic compound consisting of a non-coordinating anion and a cation, and (C) an organoaluminum compound.

8 Claims, No Drawings

PROCESS FOR PRODUCING CONJUGATED DIENE POLYMER

RELATED/PRIORITY APPLICATION

This application is a National Phase filing regarding International Application No. PCT/JP2009/071652, filed on Dec. 25, 2009, which relies upon the following Japanese Patent applications for priority: Japanese Patent Application No, 2008-329287, filed on Dec. 25, 2008; Japanese Patent Application No, 2008-329288, filed on Dec. 25, 2008; Japanese Patent Application No, 2009-071280, filed on Mar. 24, 2009 and Japanese Patent Application No. 2009-'259383, filed on Nov. 13, 2009.

TECHNICAL FIELD

The present invention relates to a process for producing a conjugated diene polymer having a very high content of cis-1,4 structures by using a catalyst containing an yttrium compound.

BACKGROUND ART

Conventionally, many proposals have been made for catalysts for polymerizing conjugated dienes such as 1,3-butadiene, isoprene, etc., and some of the proposals have been industrialized. For example, catalysts consisting of a combination of a transition metal compound such as titanium, cobalt, nickel, neodymium, etc., and an organic aluminum are often used for producing conjugated diene polymers having a high content of cis-1,4 structures.

Polymerization of a conjugated diene using an element of Group III of the periodic table as a catalyst is publicly-known, and various polymerization methods have been proposed so far. For example, JPH7-268013A (Patent Document 1) discloses a catalytic system consisting of a rare-earth metal salt, an organic metal compound of an element of Group I to III of the periodic table, and a fluorine-containing organoboron compound. JPH11-80222A (Patent Document 2) discloses a polymerization catalyst consisting of a compound of a metal of Group IIIB of the periodic table, an ionic compound of a non-coordinating anion and a cation, and an organic metal compound of an element of Group I to III of the periodic table.

As a polymerization catalyst using an yttrium compound, Pamphlet of International Publication No. 2006/049016 (Patent Document 3) discloses a catalytic system using an yttrium compound containing a bulky substituent group, and JP2007-161918A (Patent Document 4) discloses a catalytic system using an yttrium compound containing bis(trimethylsilyl) amide as a ligand. The content of cis-1,4 structures in conjugated diene polymers obtained using such catalytic systems is generally 97 to 98.5%.

As a catalytic system by which a conjugated diene polymer having a very high content of cis-1,4 structures can be obtained, JP2002-256012A (Patent Document 5), JP2004-027179A (Patent Document 6), etc. disclose catalysts that contain a metallocene-type cation complex of a rare-earth metal compound. However, a metallocene-type complex is difficult to synthesize and isolate, and hard to handle because it is very sensitive to air, water, etc. There is another problem; a conjugated diene polymer having a very high content of cis-1,4 structures can be obtained only at a low polymerization temperature.

CONVENTIONAL ART DOCUMENT

Patent Document

Patent Document 1: JPH7-70143A
Patent Document 2: JPH7-268013A
Patent Document 3: Pamphlet of International Publication No. 2006/049016
Patent Document 4: JP2007-161918A
Patent Document 5: JP2002-256012A
Patent Document 6: JP2004-027179A

DISCLOSURE OF INVENTION

Problem to be Solved by the Invention

The present invention aims for providing a process for producing a conjugated diene polymer with a very high content of cis-1,4 structures which particularly contains cis-1,4 structures at a ratio of 99% or higher, by using a catalyst that is relatively easy to handle and has a high activity.

Means for Solving the Problem

The present invention provides a process for producing a conjugated diene polymer, comprising polymerizing a conjugated diene at lower than 40° C. in the presence of a catalyst consisting of (A) an yttrium compound represented by a general formula (1) indicated below, (B) an ionic compound consisting of a non-coordinating anion and a cation, and (C) an organoaluminum compound.

[Chemical Formula 1]

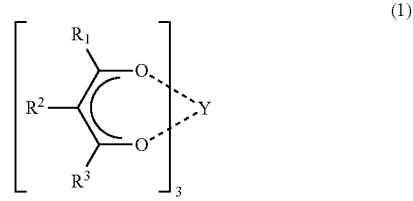

(where $R^1$ to $R^3$ represent hydrogen or a substituent group with 1 to 12 carbon atom/s, and Y represents an yttrium atom).

The present invention also provides a catalyst for producing a conjugated diene polymer, consisting of (A) an yttrium compound represented by a general formula (2) indicated below, (B) an ionic compound consisting of a non-coordinating anion and a cation, and (C) an organoaluminum hydride compound, wherein a molar ratio (C)/(A) between (C) and (A) is 5 to 50, and a process for producing a conjugated diene polymer using this catalyst.

[Chemical Formula 2]

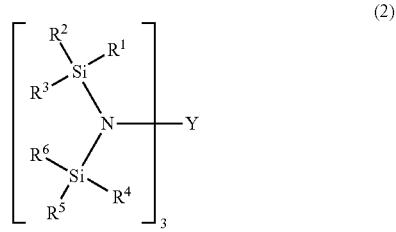

(where $R^1$ to $R^6$ represent hydrogen or a substituent group with 1 to 12 carbon atom/s, and Y represents an yttrium atom).

Effect of the Invention

The present invention enables to highly efficiently produce a conjugated diene polymer containing cis-1,4 structures at a ratio of 99% or higher.

BEST MODE FOR CARRYING OUT THE INVENTION

Examples of an yttrium compound which is a component (A) of a catalytic system include: yttrium salt such as yttrium trichloride, yttrium tribromide, yttrium triiodide, yttrium nitrate, yttrium sulfate, yttrium trifluoromethanesulfonate, yttrium acetate, yttrium trifluoroacetate, yttrium malonate, yttrium octylate (ethylhexanoate), yttrium naphthenate, yttrium versatate, yttrium neodecanoate, etc.; alcoxide such as yttrium trimethoxide, yttrium triethoxide, yttrium triisopropoxide, yttrium tributoxide, yttrium triphenoxide, etc.; an organoyttrium compound such as tris acetylacetonato yttrium, tris(hexanedionato) yttrium, tris(heptanedionato) yttrium, tris (dimethylheptanedionato) yttrium, tris(tetramethylheptanedionato) yttrium, tris acetoacetato yttrium, cyclopentadienyl yttrium dichloride, dicyclopentadienyl yttrium chloride, tricyclopentadienyl yttrium, etc.; an organic base complex such as pyridine complex of yttrium salt, picoline complex of yttrium salt, etc.; yttrium salt hydrate; alcohol complex of yttrium salt; etc. Particularly, an yttrium compound represented by a general formula (1) or (2) indicated below is preferable.

[Chemical Formula 3]

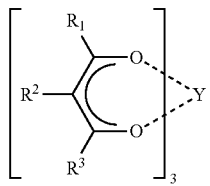

(1)

(where $R^1$ to $R^3$ represent hydrogen or a substituent group with 1 to 12 carbon atom/s, and Y represents an yttrium atom.)

[Chemical Formula 4]

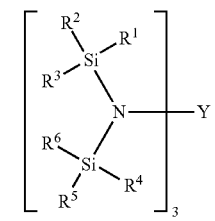

(2)

(where $R^1$ to $R^6$ represent hydrogen or a substituent group with 1 to 12 carbon atom/s, and Y represents an yttrium atom.)

Specific examples of the above-described substituent group with 1 to 12 carbon atom/s include methyl group, ethyl group, vinyl group, n-propyl group, isopropyl group, 1-propenyl group, allyl group, n-butyl group, s-butyl group, isobutyl group, t-butyl group, n-pentyl group, 1-methylbutyl group, 2-methylbutyl group, 3-methylbutyl group, 1,1-dimethylpropyl group, 1,2-dimethylpropyl group, 2,2-dimethylpropyl group, hexyl group, heptyl group, octyl group, nonyl group, decyl group, undecyl group, dodecyl group, cyclohexyl group, methylcyclohexyl group, ethylcyclohexyl group, phenyl group, benzyl group, tolyl group, phenethyl group, etc. Examples further include these groups described above that have a hydroxyl group, carboxyl group, carbomethoxy group, carboethoxy group, amide group, amino group, alkoxy group, phenoxy group, etc. substituted at an arbitrary position. It is preferable that $R^1$ to $R^6$ be hydrogen or a hydrocarbon group with 1 to 12 carbon atom/s.

Specific examples of yttrium compounds represented by the general formula (1) indicated above include tris(acetylacetonato)yttrium, tris(hexanedionato)yttrium, tris(heptanedionato)yttrium, tris(dimethylheptanedionato)yttrium, tris(trimethylheptanedionato)yttrium, tris(tetramethylheptanedionato)yttrium, tris(pentamethylheptanedionato)yttrium, tris(hexamethylheptanedionato)yttrium, trisacetoacetato yttrium, etc.

Specific examples of yttrium compounds represented by the general formula (2) include tris[N,N-bis(trimethylsilyl)amide]yttrium, tris[N,N-bis(triethylsilyl)amide]yttrium, tris[N,N-bis(dimethylphenylsilyl)amide]yttrium, tris[N,N-bis(t-butyl)amide]yttrium, tris[N,N-bis(dimethylphenylmethyl)amide]yttrium, etc.

An ionic compound which is a component (B) of the catalytic system consists of a non-coordinating anion and a cation. The ionic compound may be any combination of a non-coordinating anion and a cation that are arbitrarily selected from publicly-known non-coordinating anions and cations respectively.

Examples of a non-coordinating anion include tetra(phenyl)borate, tetra(fluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(3,5-bistrifluoromethylphenyl)borate, tetrakis(tetrafluoromethylphenyl)borate, tetra(tolyl)borate, tetra(xylyl)borate, triphenyl(pentafluorophenyl)borate, tris(pentafluorophenyl)(phenyl)borate, tridecahydride-7,8-dicarbaundecaborate, tetrafluoro borate, hexafluorophosphate, etc.

On the other hand, examples of a cation include carbonium cation, oxonium cation, ammonium onium cation, phosphonium cation, cycloheptatrienyl cation, ferrocenium cation, etc.

Specific examples of carbonium cation include tri-substituted carbonium cation such as triphenyl carbonium cation, tri-substituted phenylcarbonium cation, etc. Specific examples of tri-substituted phenylcarbonium cation include tri(methylphenyl)carbonium cation, tri(dimethylphenyl)carbonium cation, etc.

Specific examples of ammonium cation include: trialkyl ammonium cation such as trimethyl ammonium cation, triethyl ammonium cation, tripropyl ammonium cation, tributyl ammonium cation, tri(n-butyl)ammonium cation, etc.; N,N-dialkyl anilinium cation such as N,N-dimethyl anilinium cation, N,N-diethyl anilinium cation, N,N-2,4,6-pentamethyl anilinium cation, etc.; and dialkyl ammonium cation such as di(i-propyl) ammonium cation, dicyclohexyl ammonium cation, etc.

Specific examples of phosphonium cation include aryl phosphonium cation such as triphenyl phosphonium cation, tetraphenyl phosphonium cation, tri(methylphenyl)phosphonium cation, tetra(methylphenyl)phosphonium cation, tri(dimethylphenyl)phosphonium cation, tetra(dimethylphenyl)phosphonium cation, etc.

A preferable combination of a non-coordinating anion and a cation is a combination of a boron-containing compound and carbocation. Specific examples of ionic compounds include triphenyl carbonium tetrakis(pentafluorophenyl)borate, triphenyl carbonium tetrakis(fluorophenyl)borate, N,N-dimethyl anilinium tetrakis (pentafluorophenyl) borate, 1,1'-dimethyl ferrocenium tetrakis(pentafluorophenyl)borate, etc. These ionic compounds may be used singly or two or more kinds of ionic compounds may be used in combination.

Aluminoxane may be used instead of the ionic compound which is the component (B) and consists of a non-coordinating anion and a cation. Aluminoxane is obtained by bringing an organoaluminum compound into contact with a condensing agent, and examples thereof include a chain aluminoxane and a cyclic aluminoxane which are represented by a general formula (—Al(R')O—)n. (R' represents a hydrocarbon group with 1 to 10 carbon atom/s, and examples thereof include one that is partially substituted for by a halogen atom and/or an alkoxy group. n represents a degree of polymerization, and is 5 or higher, or preferably 10 or higher.) R' may be methyl, ethyl, propyl, isobutyl groups, etc., but a methyl group is preferable. An organoaluminum compound used as the material of aluminoxane may be, for example, trialkyl aluminum such as trimethyl aluminum, triethyl aluminum, triisobutyl aluminum, etc., and a mixture of these trialkyl aluminum.

Among them, an aluminoxane which utilizes a mixture of trimethyl aluminum and tributyl aluminum as a material can be used preferably.

A typical example of the condensing agent described above is water, but other than this, examples thereof include an arbitrary agent with which trialkyl aluminum can cause a condensation reaction, such as adsorbed water in an inorganic substance or the like, diol, etc.

Examples of an organoaluminum compound which is a component (C) of the catalytic system include trialkyl aluminum, and other than this, an organoaluminum halide compound such as dialkyl aluminum chloride, dialkyl aluminum bromide, alkyl aluminum sesquichloride, alkyl aluminum sesquibromide, alkyl aluminum dichloride, etc., an organoaluminum hydride compound such as dialkyl aluminum hydride, etc.

Specific examples of trialkyl aluminum include trimethyl aluminum, triethyl aluminum, triisobutyl aluminum, trihexyl aluminum, trioctyl aluminum, tridecyl aluminum, etc.

Specific examples of organoaluminum halide compounds include: dialkyl aluminum chloride such as dimethyl aluminum chloride, diethyl aluminum chloride, etc.; ethyl aluminum sesquichloride; ethyl aluminum dichloride; etc. Specific examples of organoaluminum hydride compounds include diethyl aluminum hydride, diisobutyl aluminum hydride, ethyl aluminum sesquihydride, etc.

These organoaluminum compounds may be used singly or two or more kinds of organoaluminum compounds may be used in combination.

When using an yttrium compound represented by the general formula (1) indicated above as the component (A), it is preferable to use trialkyl aluminum, especially triethyl aluminum (TEA), as the component (C).

The amounts of the catalyst components (A) to (C) and the ratio among them are adjusted as may be needed to impart an intended property to the polymer to be obtained. Normally, the amount of the component (A) is preferably 0.0001 to 0.5 mmol and particularly preferably 0.0005 to 0.1 with respect to 100 g of conjugated diene monomer. The molar ratio (A)/(B) between the component (A) and the component (B) is preferably 1/1.0 to 1/5.0 and particularly preferably 1/1.0 to 1/3.0. The molar ratio (A)/(C) between the component (A) and the component (C) is preferably 1/1 to 1/5000 and particularly preferably 1/10 to 1/2000.

When using an yttrium compound represented by the general formula (2) indicated above as the component (A), it is preferable to use an organoaluminum hydride, especially diethyl aluminum hydride (DEAH), as the component (C). In this case, the molar ratio (C)/(A) between the component (C) and the component (A) is preferably 5 to 50, more preferably 20 to 45, and particularly preferably 30 to 40.

The catalyst components may be mixed either in the presence of or in the absence of a conjugated diene to be polymerized. The mixing method is not particularly limited, but may be carried out as follows, for example.

(1) To add the component (C) to an inert organic solvent and then add the component (A) and the component (B) in an arbitrary order.

(2) To add the component (C) to an inert organic solvent and add a molecular weight modifier, and after this add the component (A) and the component (B) in an arbitrary order.

(3) To add the component (A) to an inert organic solvent and add the component (C) and the molecular weight modifier described above in an arbitrary order, and after this add the component (B).

(4) To add the component (B) to an inert organic solvent and add the component (C) and the molecular weight modifier described above in an arbitrary order, and after this add the component (A).

(5) To add the component (C) to an inert organic solvent and add the component (A) and the component (B) in an arbitrary order, and after this add the molecular weight modifier described above.

Some of the components may be mixed and aged in advance. Particularly, it is preferable to mix and age the component (A) and the component (C) in advance.

When using an yttrium compound represented by the general formula (1) indicated above as the component (A), the aging temperature is preferably not lower than 0° C. and lower than 50° C. A more preferable temperature range is 10 to 45° C., and a particularly preferable range is 20 to 40° C. The aging time is 5 to 300 minutes, but preferably 10 to 240 minutes, and particularly preferably 15 to 180 minutes.

When using an yttrium compound represented by the general formula (2) indicated above as the component (A), the aging temperature is −50° C. to 80° C., and preferably −10 to 50° C., and the aging time is 0.01 to 24 hours, preferably 0.05 to 5 hours, and particularly preferably 0.1 to 1 hour.

The catalyst obtained in the way described above can also be used as supported on an inorganic compound, an organic polymer compound, etc.

The polymerization solvent is not limited and may be, for example, aliphatic hydrocarbon such as butane, pentane, hexane, heptane, etc., alicyclic hydrocarbon such as cyclopentane, cyclohexane, etc., aromatic hydrocarbon such as benzene, toluene, xylene, ethylbenzene, etc., an olefinic hydrocarbon such as the olefin compound described above, cis-2-butene, trans-2-butene, etc. Particularly, benzene, toluene, cyclohexane, or a mixture of cis-2-butene and trans-2-butene, etc. is preferable. Bulk polymerization in which a monomer itself is used as the polymerization solvent may also be employed.

The concentration of the conjugated diene monomer in solution polymerization is preferably 5 to 70% by weight and particularly preferably 10 to 50% by weight.

When using an yttrium compound represented by the general formula (1) indicated above as the component (A), the polymerization temperature range is preferably not lower than −10° C. and lower than 40° C. A more preferable temperature range is 0 to 38° C., and a particularly preferable range is 5 to 35° C. The polymerization time is preferably 1 minute to 12 hours, and particularly preferably 5 minutes to 5 hours.

When using an yttrium compound represented by the general formula (2) indicated above, the polymerization temperature is preferably −30 to 150° C., more preferably −20 to 80° C., and particularly preferably 0 to 50° C.

Examples of conjugated dienes that can be polymerized include 1,3-butadiene, 2-methyl-1,3-butadiene(isoprene), 2,3-dimethyl-1,3-butadiene, 1,3-pentadiene(piperylene), 1,3-hexadiene, 1,3-cyclohexadiene, etc. These conjugated dienes may be used singly, or two or more kinds of conjugated dienes may be used in combination to obtain a copolymer. A preferable conjugated diene is 1,3-butadiene or isoprene.

When polymerizing a conjugated diene, it is possible to use hydrogen, a hydrogenated metal compound, or a hydrogenated organic metal compound as a molecular weight modifier. It is particularly preferable to regulate molecular weights by using hydrogen.

After polymerization is promoted for a certain time, pressure discharge is carried out in the polymerization tank if necessary, and aftertreatments such as washing, drying, etc. are carried out.

A conjugated diene polymer obtained according to the present invention contains cis-1,4 structures at a ratio of 99% or higher. The higher the content of cis-1,4 structures is, the better performance is exhibited in rubber properties such as impact resilience, abrasion resistance, breaking strength, etc.

EXAMPLE

Examples based on the present invention will be described below specifically. Polymerization conditions and polymerization results are shown in Table 1 and Table 2 collectively.

Infrared absorption spectrometry was conducted to analyze a microstructure. A microstructure was calculated from the absorption intensity ratio at cis 740 cm$^{-1}$, trans 967 cm$^{-1}$, vinyl 910 cm$^{-1}$.

Molecular weight and molecular weight distribution were evaluated based on weight-average molecular weight Mw and a ratio Mw/Mn between the weight-average molecular weight Mw and a number average molecular weight Mn which were obtained by GPC using polystyrene as a standard substance.

Example 1

An autoclave having an internal capacity of 1.5 L was purged with nitrogen, and a solution consisting of 390 ml of toluene and 210 ml of butadiene was poured into the autoclave. After the temperature of the solution was set to 30° C., 1.5 ml of a cyclohexane solution including triethyl aluminum (TEA) (2 mol/L) was added, and the resulting solution was stirred for three minutes at 500 rpm. Next, 0.6 ml of a toluene solution including yttrium (III) tris(2,2,6,6-tetramethyl-3,5-heptanedioate) (0.05 mol/L) was added, and the resulting solution was aged at 30° C. for two minutes. After this, 0.14 ml of a toluene solution including triphenylcarbeniumtetrakis (pentafluorophenyl) borate (0.43 mol/L) was added. Then, the resulting solution was polymerized at 30° C. for 25 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1 and Table 2.

Example 2

Polymerization was promoted under the same conditions as Example 1, except that the polymerization temperature was 20° C. The result of polymerization is shown in Table 1 and Table 2.

Example 3

Polymerization was promoted under the same conditions as Example 1, except that the polymerization temperature was 10° C. The result of polymerization is shown in Table 1 and Table 2.

Example 4

An autoclave having an internal capacity of 1.5 L was purged with nitrogen, and a solution consisting of 390 ml of toluene and 210 ml of butadiene was poured into the autoclave. Then, a hydrogen gas having 0.07 MPa/cm$^2$ was added. After the temperature of the solution was set to 30° C., 1.5 ml of a cyclohexane solution including triethyl aluminum (TEA) (2 mol/L) was added, and the resulting solution was stirred for three minutes at 500 rpm. Next, 0.6 ml of a toluene solution including yttrium (III) tris (2,2,6,6-tetramethyl-3,5-heptanedioate) (0.05 mol/L) was added, and the resulting solution was aged at 30° C. for 30 minutes. After this, 0.14 ml of a toluene solution including triphenylcarbeniumtetrakis(pentafluorophenyl) borate (0.43 mol/L) was added. Then, the resulting solution was polymerized at 30° C. for 30 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected butadiene was dried at 80° C. for three hours in a vacuum. The result of polymerization is shown in Table 1 and Table 2.

Example 5

An autoclave having an internal capacity of 1.5 L was purged with nitrogen, and a solution consisting of 390 ml of toluene and 210 ml of butadiene was poured into the autoclave. Then, a hydrogen gas having 0.07 MPa/cm$^2$ was added. After the temperature of the solution was set to 30° C., 1.2 ml of a cyclohexane solution including triethyl aluminum (TEA) (2 mol/L) was added, and the resulting solution was stirred for three minutes at 500 rpm. Next, the solution was elevated to 40° C., 0.48 ml of a toluene solution including yttrium (III) tris(2,2,6,6-tetramethyl-3,5-heptanedioate) (0.05 mol/L) was added, and the resulting solution was aged at 40° C. for 60 minutes. Next, the solution was lowered to 30° C., and 0.11 ml of a toluene solution including triphenylcarbeniumtetrakis (pentalfluorophenyl) borate (0.43 mol/L) was added. Then, the resulting solution was polymerized at 30° C. for 25 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1 and Table 2.

Example 6

An autoclave having an internal capacity of 1.5 L was purged with nitrogen, and a solution consisting of 350 ml of toluene and 250 ml of butadiene was poured into the autoclave. Then, a hydrogen gas having 0.07 MPa/cm$^2$ was added. After the temperature of the solution was set to 30° C., 1.2 ml of a cyclohexane solution including triethyl aluminum (TEA) (2 mol/L) was added, and the resulting solution was stirred for three minutes at 500 rpm. Next, the solution was elevated to 40° C., 0.48 ml of a toluene solution including yttrium (III) tris(2,2,6,6-tetramethyl-3,5-heptanedioate) (0.05 mol/L) was added, and the resulting solution was aged at 40° C. for 60 minutes. Next, the solution was lowered to 30° C., and 0.11 ml of a toluene solution including triphenylcarbeniumtetrakis (pentafluorophenyl) borate (0.43 mol/L) was added. Then, the resulting solution was polymerized at 30° C. for 20 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1 and Table 2.

Example 7

An autoclave having an internal capacity of 1.5 L was purged with nitrogen, and a solution consisting of 300 ml of toluene and 300 ml of butadiene was poured into the autoclave. Then, a hydrogen gas having 0.07 MPa/cm$^2$ was added. After the temperature of the solution was set to 30° C., 1.2 ml of a cyclohexane solution including triethyl aluminum (TEA) (2 mol/L) was added, and the resulting solution was stirred for three minutes at 500 rpm. Then, the solution was elevated to 40° C., 0.48 ml of a toluene solution including yttrium (III) tris(2,2,6,6-tetramethyl-3,5-heptanedioate) (0.05 mol/L) was added, and the resulting solution was aged at 40° C. for 60 minutes. Next, the solution was lowered to 30° C., and 0.11 ml of a toluene solution including triphenylcarbeniumtetrakis (pentafluorophenyl) borate (0.43 mol/L) was added. Then, the resulting solution was polymerized at 30° C. for 20 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1 and Table 2.

Example 8

An autoclave having an internal capacity of 1.5 L was purged with nitrogen, and a solution consisting of 390 ml of toluene and 210 ml of butadiene was poured into the autoclave. After the temperature of the solution was set to 30° C., 3.0 ml of a cyclohexane solution including triethyl aluminum (TEA) (2 mol/L) was added, and the resulting solution was stirred for three minutes at 500 rpm. Next, 1.2 ml of a toluene solution including yttrium (III) tris(2,2,6,6-tetramethyl-3,5-heptanedioate) (0.05 mol/L) was added, and the resulting solution was stirred at 30° C. for 30 minutes. After this, the solution was cooled to 0° C. Next, 0.28 ml of a toluene solution including triphenylcarbeniumtetrakis(pentafluorophenyl) borate (0.43 mol/L) was added. Then, the resulting solution was polymerized at 0° C. for 25 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1 and Table 2.

Example 9

An autoclave having an internal capacity of 1.5 L was purged with nitrogen, and a solution consisting of 390 ml of toluene and 210 ml of butadiene was poured into the autoclave. After the temperature of the solution was set to 30° C., 3.0 ml of a toluene solution including triethyl aluminum (TEA) (1 mol/L) was added, and the resulting solution was stirred for three minutes at 500 rpm. Next, 1.5 ml of a toluene solution including yttrium (III) tris(2,2,6,6-tetramethyl-3,5-heptanedioate) (0.02 mol/L) was added, and the resulting solution was aged at 30° C. for four minutes. After this, the solution was cooled to 10° C. Next, 0.14 ml of a toluene solution including triphenylcarbeniumtetrakis(pentafluorophenyl) borate (0.43 mol/L) was added. Then, the resulting solution was polymerized at 10° C. for 30 minutes. After this, 5 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1 and Table 2.

Example 10

An autoclave having an internal capacity of 1.5 L was purged with nitrogen, and a solution consisting of 390 ml of toluene and 210 ml of butadiene was poured into the autoclave. After the temperature of the solution was set to 30° C., 3.0 ml of a toluene solution including triethyl aluminum (TEA) (1 mol/L) was added, and the resulting solution was stirred for three minutes at 500 rpm. Next, 1.5 ml of a toluene solution including yttrium (III) tris(2,2,6,6-tetramethyl-3,5-heptanedioate) (0.02 mol/L) was added, and the resulting solution was aged at 30° C. for 30 minutes. After this, the solution was cooled to 10° C. Next, 0.14 ml of a toluene solution including triphenylcarbeniumtetrakis(pentafluorophenyl) borate (0.43 mol/L) was added. Then, the resulting solution was polymerized at 10° C. for 30 minutes. After this, 5 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1 and Table 2.

Example 11

An autoclave having an internal capacity of 1.5 L was purged with nitrogen, and a solution consisting of 390 ml of toluene and 210 ml of butadiene was poured into the autoclave. Then, a hydrogen gas having 0.03 MPa/cm$^2$ was added. After the temperature of the solution was set to 30° C., 3.0 ml of a toluene solution including triethyl aluminum (TEA) (1 mol/L) was added, and the resulting solution was stirred for three minutes at 500 rpm. Next, 1.5 ml of a toluene solution including yttrium MO tris (2,2,6,6-tetramethyl-3,5-heptanedioate) (0.02 mol/L) was added, and the resulting solution was aged at 30° C. for 30 minutes. After this, the solution was cooled to 10° C. Next, 0.14 ml of a toluene solution including triphenylcarbeniumtetrakis (pentafluorophenyl) borate (0.43 mol/L) was added. Then, the resulting solution was polymerized at 10° C. for 30 minutes. After this, 5 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1 and Table 2.

Example 12

Polymerization was promoted under the same conditions as Example 7, except that the pressure of a hydrogen gas was 0.05 MPa/cm$^2$. The result of polymerization is shown in Table 1 and Table 2.

Example 13

Polymerization was promoted under the same conditions as Example 7, except that the pressure of a hydrogen gas was 0.10 MPa/cm$^2$. The result of polymerization is shown in Table 1 and Table 2.

Example 14

Polymerization was promoted under the same conditions as Example 7, except that the pressure of a hydrogen gas was 0.15 MPa/cm$^2$. The result of polymerization is shown in Table 1 and Table 2.

Example 15

An autoclave having an internal capacity of 1.5 L was purged with nitrogen, and a solution consisting of 390 ml of toluene and 210 ml of butadiene was poured into the autoclave. Then, a hydrogen gas having 0.10 MPa/cm$^2$ was added. After the temperature of the solution was set to 30° C., 3.0 ml of a toluene solution including triethyl aluminum (TEA) (1 mol/L) was added, and the resulting solution was stirred for three minutes at 500 rpm. Next, 3.0 ml of a toluene solution including yttrium (III) tris (2,2,6,6-tetramethyl-3,5-heptanedioate) (0.02 mol/L) was added, and the resulting solution was aged at 30° C. for 30 minutes. After this, 0.28 ml of a toluene solution including triphenylcarbeniumtetrakis(pentafluorophenyl) borate (0.43 mol/L) was added. Then, the resulting solution was polymerized at 10° C. for 30 minutes. After this, 5 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1 and Table 2.

Example 16

An autoclave having an internal capacity of 1.5 L was purged with nitrogen, and a solution consisting of 390 ml of toluene and 210 ml of butadiene was poured into the autoclave. Then, a hydrogen gas having 0.055 MPa/cm$^2$ was added. After the temperature of the solution was set to 30° C., 4.5 ml of a cyclohexane solution including triethyl aluminum (TEA) (1 mol/L) was added, and the resulting solution was stirred for three minutes at 500 rpm. Next, 4.5 ml of a toluene solution including yttrium (III) tris (2,2,6,6-tetramethyl-3,5-heptanedioate) (0.02 mol/L) was added, and the resulting solution was aged at 30° C. for 30 minutes. After this, the solution was cooled to 10° C. Next, 0.42 ml of a toluene solution including triphenylcarbeniumtetrakis (pentafluorophenyl) borate (0.43 mol/L) was added. Then, the resulting solution was polymerized at 10° C. for 30 minutes. After this, 5 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1 and Table 2.

Example 17

An autoclave having an internal capacity of 1.5 L was purged with nitrogen, and a solution consisting of 390 ml of toluene and 210 ml of butadiene was poured into the autoclave. After the temperature of the solution was set to 30° C., 3.0 ml of a toluene solution including triethyl aluminum (TEA) (1 mol/L) was added, and the resulting solution was stirred for three minutes at 500 rpm. Next, 1.5 ml of a toluene solution including yttrium (III) tris(2,2,6,6-tetramethyl-3,5-heptanedioate) (0.02 mol/L) was added, and the resulting solution was aged at 40° C. for 30 minutes. After this, the solution was cooled to 10° C. Next, 0.14 ml of a toluene solution including triphenylcarbeniumtetrakis(pentafluorophenyl) borate (0.43 mol/L) was added. Then, the resulting solution was polymerized at 10° C. for 30 minutes. After this, 5 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1 and Table 2.

Example 18

An autoclave having an internal capacity of 1.5 L was purged with nitrogen, and a solution consisting of 390 ml of toluene and 210 ml of butadiene was poured into the autoclave. After the temperature of the solution was set to 30° C., 5.0 ml of a cyclohexane solution including triethyl aluminum (TEA) (2 mol/L) was added, and the resulting solution was stirred for three minutes at 500 rpm. Next, 1.0 ml of a toluene solution including yttrium (III) tris(2,2,6,6-tetramethyl-3,5-heptanedioate) (0.05 mol/L) was added, and the resulting solution was elevated to 60° C. After the solution was aged at 60° C. for two minutes, it was cooled to 10° C. Next, 0.23 ml of a toluene solution including triphenylcarbeniumtetrakis (pentafluorophenyl) borate (0.43 mol/L) was added. Then, the resulting solution was polymerized at 10° C. for 30 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1 and Table 2.

Comparative Example 1

An autoclave having an internal capacity of 1.5 L was purged with nitrogen, and a solution consisting of 390 ml of toluene and 210 ml of butadiene was poured into the autoclave. After the temperature of the solution was set to 30° C., 1.5 ml of a cyclohexane solution including triethyl aluminum (TEA) (2 mol/L) was added, and the resulting solution was stirred for three minutes at 500 rpm. Next, 0.6 ml of a toluene solution including yttrium (III) tris(2,2,6,6-tetramethyl-3,5-heptanedioate) (0.05 mol/L) was added, and the resulting solution was heated to 40° C. After the solution was aged at 40° C. for two minutes, 0.14 ml of a toluene solution including triphenylcarbeniumtetrakis(pentafluorophenyl) borate (0.43 mol/L) was added. Then, the resulting solution was polymerized at 40° C. for 25 minutes. After this, 3 ml of an ethanol solution containing an antioxidant was added to stop polymerization. After pressure discharge was carried out in the autoclave, the polymerized solution was fed to ethanol, and polybutadiene was collected. Then, the collected polybutadiene was dried at 80° C. for three hours in a vacuum. The result of polymerization is shown in Table 1 and Table 2.

Example 19

An autoclave having an internal capacity of 2 L was purged with nitrogen, a solution consisting of 390 ml of toluene and 210 ml of butadiene was poured into the autoclave, hydrogen was introduced under pressure into the autoclave at 25° C. up to a gauge pressure of 1.0 kgf/cm$^2$, and the temperature of the solution was set to 30° C. After this, 0.25 ml of a toluene solution including diethyl aluminum hydride (DEAR) (2 mol/L) was added, and the resulting solution was stirred for three minutes at 550 rpm. Next, 0.6 ml of a toluene solution including tris[N,N-bis(trimethylsilyl)amide]yttrium (20 mmol/L) was added, and the resulting solution was stirred for four minutes. After this, the solution was elevated to 40° C. and 0.06 ml of a toluene solution including triphenylcarbeniumtetrakis pentafluorophenyl borate (0.43 mol/L) was added to start polymerization. After the solution was polymerized at 40° C. for 30 minutes, 5 ml of an ethanol/heptane (1/1)

TABLE 1

| | Butadiene Concentration (wt %) | Catalyst Concentration (mM) | Hydrogen Pressure (kgf/cm$^2$) | Aging Temperature (° C.) | Aging Time (min) | Polymerization Temperature (° C.) | Polymerization Time (° C.) | Activity (g · mmol$^{1-}$-Y · h$^{-1}$) |
|---|---|---|---|---|---|---|---|---|
| Example 1 | 28 | 0.05 | 0.0 | 30 | 2 | 30 | 25 | 2310 |
| Example 2 | 28 | 0.05 | 0.0 | 30 | 2 | 20 | 25 | 1360 |
| Example 3 | 28 | 0.05 | 0.0 | 30 | 2 | 10 | 25 | 370 |
| Example 4 | 28 | 0.05 | 0.7 | 30 | 30 | 30 | 30 | 4330 |
| Example 5 | 28 | 0.05 | 0.7 | 40 | 60 | 30 | 25 | 6460 |
| Example 6 | 34 | 0.05 | 0.7 | 40 | 60 | 30 | 20 | 7170 |
| Example 7 | 42 | 0.05 | 0.7 | 40 | 60 | 30 | 20 | 7130 |
| Example 8 | 28 | 0.10 | 0.0 | 30 | 30 | 0 | 25 | 30 |
| Example 9 | 28 | 0.05 | 0.0 | 30 | 4 | 10 | 30 | 430 |
| Example 10 | 28 | 0.05 | 0.0 | 30 | 30 | 10 | 30 | 1080 |
| Example 11 | 28 | 0.05 | 0.3 | 30 | 30 | 10 | 30 | 1040 |
| Example 12 | 28 | 0.05 | 0.5 | 30 | 30 | 10 | 30 | 950 |
| Example 13 | 28 | 0.05 | 1.0 | 30 | 30 | 10 | 30 | 1010 |
| Example 14 | 28 | 0.05 | 1.5 | 30 | 30 | 10 | 30 | 1010 |
| Example 15 | 28 | 0.10 | 1.0 | 30 | 30 | 10 | 30 | 920 |
| Example 16 | 28 | 0.15 | 0.55 | 30 | 30 | 10 | 30 | 730 |
| Example 17 | 28 | 0.05 | 0.0 | 40 | 30 | 10 | 30 | 980 |
| Example 18 | 28 | 0.08 | 0.0 | 60 | 2 | 10 | 30 | 1080 |
| Comparative Example 1 | 28 | 0.05 | 0.0 | 30 | 2 | 40 | 25 | 3080 |

TABLE 2

| | Microstructure (%) | | | Mw (×10$^4$) | Mn (×10$^4$) | Mw/Mn |
|---|---|---|---|---|---|---|
| | 1,4-cis | 1,4-trans | vinyl | | | |
| Example 1 | 99.1 | 0.5 | 0.4 | 31.0 | 97.0 | 3.1 |
| Example 2 | 99.2 | 0.6 | 0.2 | 37.0 | 114.3 | 3.1 |
| Example 3 | 99.6 | 0.2 | 0.2 | 38.0 | 134.6 | 3.5 |
| Example 4 | 99.4 | 0.3 | 0.3 | 23.5 | 55.2 | 2.4 |
| Example 5 | 99.3 | 0.2 | 0.4 | 30.9 | 78.6 | 2.5 |
| Example 6 | 99.3 | 0.2 | 0.4 | 39.2 | 100.6 | 2.6 |
| Example 7 | 99.2 | 0.2 | 0.4 | 45.7 | 122.2 | 2.7 |
| Example 8 | 99.5 | 0.4 | 0.1 | 41.5 | 106.7 | 2.6 |
| Example 9 | 99.3 | 0.4 | 0.3 | — | — | — |
| Example 10 | 99.4 | 0.4 | 0.2 | — | — | — |
| Example 11 | 99.2 | 0.6 | 0.2 | 50.9 | 132.5 | 2.6 |
| Example 12 | 99.3 | 0.5 | 0.2 | 37.9 | 95.9 | 2.5 |
| Example 13 | 99.2 | 0.5 | 0.3 | 22.8 | 49.6 | 2.2 |
| Example 14 | 99.2 | 0.6 | 0.2 | 16.7 | 34.5 | 2.1 |
| Example 15 | 99.2 | 0.6 | 0.2 | — | — | — |
| Example 16 | 99.2 | 0.6 | 0.9 | — | — | — |
| Example 17 | 99.3 | 0.4 | 0.3 | — | — | — |
| Example 18 | 99.2 | 0.6 | 0.3 | 65.8 | 153.4 | 2.3 |
| Comparative Example 1 | 96.5 | 2.6 | 0.8 | 20.9 | 71.3 | 3.4 | solution containing an antioxidant was added to stop polymerization. After pressure discharge was carried out in the autoclave, the polymerized solution was fed to ethanol, and polybutadiene was collected. Then, the collected polybutadiene was dried at 80° C. for three hours in a vacuum. The result of polymerization is shown in Table 3 and Table 4.

Example 20

An autoclave having an internal capacity of 2 L was purged with nitrogen, and a solution consisting of 390 ml of toluene and 210 ml of butadiene was poured into the autoclave, hydrogen was introduced under pressure into the autoclave at 25° C. up to a gauge pressure of 0.7 kgf/cm$^2$, and the temperature of the solution was set to 30° C. After this, 0.2 ml of a toluene solution including diethyl aluminum hydride (DEAR) (2 mol/L) was added, and the resulting solution was stirred for three minutes at 550 rpm. Next, 0.6 ml of a toluene solution including tris[N,N-bis(trimethylsilyl)amide]yttrium (20 mmol/L) was added, and the resulting solution was stirred for four minutes. After this, the solution was elevated to 40° C. and 0.06 ml of a toluene solution including triphenylcarbeniumtetrakis pentafluorophenyl borate (0.43 mol/L) was added to start polymerization. After the solution was polymerized at 40° C. for 30 minutes, 5 ml of an ethanol/heptane (1/1) solution containing an antioxidant was added to stop polymerization. After pressure discharge was carried, out in the autoclave, the polymerized solution was fed to ethanol, and polybutadiene was collected. Then, the collected polybutadiene was dried at 80° C. for three hours in a vacuum. The result of polymerization is shown in Table 3 and Table 4.

Example 21

Polymerization was promoted under the same conditions as Example 20, except that hydrogen was introduced under pressure up to a gauge pressure of 1.0 kgf/cm$^2$. The result of polymerization is shown in Table 3 and Table 4.

Example 22

An autoclave having an internal capacity of 2 L was purged with nitrogen, a solution consisting of 390 ml of toluene and 210 ml of butadiene was poured into the autoclave, and the temperature of the solution was set to 30° C. Then, after hydrogen was introduced under pressure up to a gauge pressure of 1.0 kgf/cm$^2$, 0.18 ml of a toluene solution including diethyl aluminum hydride (DEAH) (2 mol/L) was added, and the resulting solution was stirred for three minutes at 550 rpm. Next, 0.9 ml of a toluene solution including tris[N,N-bis(trimethylsilyl)amide]yttrium (10 mmol/L) was added, and the resulting solution was stirred for four minutes. After this, the solution was elevated to 40° C. and 4.5 ml of a toluene solution including triphenylcarbeniumtetrakis pentafluorophenyl borate (4 mmol/L) was added to start polymerization. After the solution was polymerized at 40° C. for 30 minutes, 5 ml of an ethanol/heptane (1/1) solution containing an antioxidant was added to stop polymerization. After pressure discharge was carried out in the autoclave, the polymerized solution was fed to ethanol, and polybutadiene was collected. Then, the collected polybutadiene was dried at 80° C. for three hours in a vacuum. The result of polymerization is shown in Table 3 and Table 4.

Example 23

Polymerization was promoted under the same conditions as Example 22, except that a solution consisting of 310 ml of toluene and 290 ml of butadiene was poured. The result of polymerization is shown in Table 3 and Table 4.

Example 24

An autoclave having an internal capacity of 2 L was purged with nitrogen, a solution consisting of 390 ml of toluene and 210 ml of butadiene was poured into the autoclave, and the temperature of the solution was set to 30° C. After this, 0.2 ml of a toluene solution including diethyl aluminum hydride (DEAR) (2 mol/L) was added, and the resulting solution was stirred for three minutes at 550 rpm. Next, 0.6 ml of a toluene solution including tris[N,N-bis(trimethylsilyl)amide]yttrium (20 mmol/L) was added, and the resulting solution was stirred for four minutes. After this, the solution was cooled to 20° C. and 0.06 ml of a toluene solution including triphenylcarbeniumtetrakis pentafluorophenyl borate (0.43 mol/L) was added to start polymerization. After the solution was polymerized at 20° C. for 30 minutes, 5 ml of an ethanol/heptane (1/1) solution containing an antioxidant was added to stop polymerization. After pressure discharge was carried out in the autoclave, the polymerized solution was fed to ethanol, and polybutadiene was collected. Then, the collected polybutadiene was dried at 80° C. for three hours in a vacuum. The result of polymerization is shown in Table 3 and Table 4.

Example 25

An autoclave having an internal capacity of 2 L was purged with nitrogen, a solution consisting of 390 ml of toluene and 210 ml of butadiene was poured into the autoclave, hydrogen was introduced under pressure into the autoclave at 25° C. up to a gauge pressure of 1.0 kgf/cm$^2$, and the temperature of the solution was set to 30° C. After this, 0.18 ml of a toluene solution including diethyl aluminum hydride (DEAR) (2 mol/L) was added, and the resulting solution was stirred for three minutes at 550 rpm. Next, 0.6 ml of a toluene solution including tris[N,N-bis(trimethylsilyl)amide]yttrium (20 mmol/L) was added, and the resulting solution was stirred for four minutes. After this, the solution was cooled to 20° C. and 0.06 ml of a toluene solution including triphenylcarbeniumtetrakis pentafluorophenyl borate (0.43 mol/L) was added to start polymerization. After the solution was polymerized at 20° C. for 45 minutes, 5 ml of an ethanol/heptane (1/1) solution containing an antioxidant was added to stop polymerization. After pressure discharge was carried out in the autoclave, the polymerized solution was fed to ethanol, and polybutadiene was collected. Then, the collected polybutadiene was dried at 80° C. for three hours in a vacuum. The result of polymerization is shown in Table 3 and Table 4.

Example 26

An autoclave having an internal capacity of 2 L was purged with nitrogen, a solution consisting of 390 ml of toluene and 210 ml of butadiene was poured into the autoclave, hydrogen was introduced under pressure into the autoclave at 25° C. up to a gauge pressure of 1.0 kgf/cm$^2$, and the temperature of the solution was set to 30° C. After this, 0.24 ml of a toluene solution including diethyl aluminum hydride (DEAH) (2 mol/L) was added, and the resulting solution was stirred for three minutes at 550 rpm. Next, 1.5 ml of a toluene solution including tris[N,N-bis(trimethylsilyl)amide]yttrium (20 mmol/L) was added, and the resulting solution was stirred for four minutes. After this, the solution was cooled to 0° C. and 0.14 ml of a toluene solution including triphenylcarbeniumtetrakis pentafluorophenyl borate (0.43 mol/L) was added to start polymerization. After the solution was polymerized at 0° C. for 90 minutes, 5 ml of an ethanol/heptane (1/1) solution containing an antioxidant was added to stop polymerization. After pressure discharge was carried out in the autoclave, the polymerized solution was fed to ethanol, and polybutadiene was collected. Then, the collected polybutadiene was dried at 80° C. for three hours in a vacuum. The result of polymerization is shown in Table 3 and Table 4.

Example 27

An autoclave having an internal capacity of 2 L was purged with nitrogen, a solution consisting of 390 ml of toluene and 210 ml of butadiene was poured into the autoclave, and the temperature of the solution was set to 30° C. Then, after hydrogen was introduced under pressure up to a gauge pressure of 0.5 kgf/cm$^2$, 0.27 ml of a toluene solution including diethyl aluminum hydride (DEAR) (2 mol/L) was added, and the resulting solution was stirred for three minutes at 550 rpm. Next, 3.0 ml of a toluene solution including tris[N,N-bis(trimethylsilyl)amide]yttrium (20 mmol/L) was added, and the resulting solution was stirred for four minutes. After this, the solution was cooled to −10° C. and 0.28 ml of a toluene solution including triphenylcarbeniumtetrakis pentafluorophenyl borate (0.43 mol/L) was added to start polymerization. After the solution was polymerized at −10° C. for 90 minutes, 5 ml of an ethanol/heptane (1/1) solution containing an antioxidant was added to stop polymerization. After pressure discharge was carried out in the autoclave, the polymerized solution was fed to ethanol, and polybutadiene was collected. Then, the collected polybutadiene was dried at 80° C. for three hours in a vacuum. The result of polymerization is shown in Table 3 and Table 4.

Example 28

An autoclave having an internal capacity of 2 L was purged with nitrogen, a solution consisting of 390 ml of toluene and 210 ml of butadiene was poured into the autoclave, and the temperature of the solution was set to 30° C. Then, after hydrogen was introduced under pressure into the autoclave up to 0.5 kgf/cm$^2$, 1.5 ml of a toluene solution including diethyl aluminum hydride (DEAR) (2 mol/L) was added, and the resulting solution was stirred for three minutes at 550 rpm. Next, 6.0 ml of a toluene solution including tris[N,N-bis(trimethylsilyl)amide]yttrium (50 mmol/L) was added, and the resulting solution was stirred for four minutes. After this, the solution was cooled to −20° C. and 1.4 ml of a toluene solution including triphenylcarbeniumtetrakis pentafluorophenyl borate (0.43 mol/L) was added to start polymerization. After the solution was polymerized at −20° C. for 90 minutes, 5 ml of an ethanol/heptane (1/1) solution containing an antioxidant was added to stop polymerization. After pressure discharge was carried out in the autoclave, the polymerized solution was fed to ethanol, and polybutadiene was collected. Then, the collected polybutadiene was dried at 80° C. for three hours in a vacuum. The result of polymerization is shown in Table 3 and Table 4.

Comparative Example 2

An autoclave having an internal capacity of 2 L was purged with nitrogen, a solution consisting of 260 ml of toluene and 140 ml of butadiene was poured into the autoclave, and the temperature of the solution was set to 30° C. After this, 2 ml of a toluene solution including triethyl aluminum (TEA) (1 mol/L) was added, and the resulting solution was stirred for three minutes at 500 rpm. Next, 1 ml of a toluene solution including tris[N,N-bis(trimethylsilyl)amide]yttrium (20 mmol/L) was added, and the resulting solution was heated to 40° C. Then, after the solution was stirred for four minutes and 0.1 ml of a toluene solution including triphenylcarbeniumtetrakis pentafluorophenyl borate (0.4 mol/L) was added to start polymerization. After the solution was polymerized at 40° C. for 30 minutes, 5 ml of an ethanol/heptane (1/1) solution containing an antioxidant was added to stop polymerization. After pressure discharge was carried out in the autoclave, the polymerized solution was fed to ethanol, and polybutadiene was collected. Then, the collected polybutadiene was dried at 70° C. for six hours in a vacuum. The result of polymerization is shown in Table 3 and Table 4.

Comparative Example 3

Polymerization was promoted under the same conditions as Comparative Example 2, except that a toluene solution including diethyl aluminum hydride (DEAH) (1 mol/L) was used instead of a toluene solution including triethyl aluminum (TEA) (1 mol/L). The result of polymerization is shown in Table 3 and Table 4.

Comparative Example 4

An autoclave having an internal capacity of 2 L was purged with nitrogen, a solution consisting of 390 ml of toluene and 210 ml of butadiene was poured into the autoclave, and the temperature of the solution was set to 30° C. After this, 0.9 ml of a toluene solution including triethyl aluminum (TEA) (1 mol/L) was added, and the resulting solution was stirred for three minutes at 550 rpm. Next, 1.5 ml of a toluene solution including tris[N,N-bis(trimethylsilyl)amide]yttrium (20 mmol/L) was added, and the resulting solution was stirred for four minutes. After this, the solution was elevated to 40° C. and 0.14 ml of a toluene solution including triphenylcarbeniumtetrakis pentafluorophenyl borate (0.43 mol/L) was added to start polymerization. After the solution was polymerized at 40° C. for 30 minutes, 5 ml of an ethanol/heptane (1/1) solution containing an antioxidant was added to stop polymerization. After pressure discharge was carried out in the autoclave, the polymerized solution was fed to ethanol, and polybutadiene was collected. Then, the collected polybutadiene was dried at 80° C. for three hours in a vacuum. The result of polymerization is shown in Table 3 and Table 4.

TABLE 3

| | Butadiene Concentration (wt %) | Catalyst Concentration (mM) | Aluminum Compound | Aluminum Concentration (mM) | Al/Y (mol/mol) | Hydrogen Pressure (kgf/cm$^2$) | Polymerization Temperature (° C.) | Activity (g · mmol$^{1-}$-Y · h$^{-1}$) |
|---|---|---|---|---|---|---|---|---|
| Example 19 | 28 | 0.02 | DEAH | 0.8 | 40 | 1.0 | 40 | 10430 |
| Example 20 | 28 | 0.02 | DEAH | 0.7 | 35 | 0.7 | 40 | 9030 |
| Example 21 | 28 | 0.02 | DEAH | 0.7 | 35 | 1.0 | 40 | 9150 |
| Example 22 | 28 | 0.015 | DEAH | 0.6 | 40 | 1.0 | 40 | 7120 |
| Example 23 | 40 | 0.015 | DEAH | 0.6 | 40 | 1.0 | 40 | 6370 |
| Example 24 | 28 | 0.02 | DEAH | 0.7 | 35 | 0.0 | 20 | 2760 |
| Example 25 | 28 | 0.02 | DEAH | 0.6 | 30 | 1.0 | 20 | 2570 |
| Example 26 | 28 | 0.05 | DEAH | 0.8 | 15 | 1.0 | 0 | 344 |
| Example 27 | 28 | 0.1 | DEAH | 0.9 | 9 | 0.5 | −10 | 27 |
| Example 28 | 28 | 0.5 | DEAH | 5.0 | 10 | 0.5 | −20 | 9 |
| Comparative Example 2 | 28 | 0.05 | TEA | 5.0 | 100 | 0 | 40 | 2640 |
| Comparative Example 3 | 28 | 0.05 | DEAH | 5.0 | 100 | 0 | 40 | 500 |
| Comparative Example 4 | 28 | 0.05 | TEA | 1.5 | 30 | 0 | 40 | 2720 |

TABLE 4

|  | Microstructure (%) | | | Mw ($\times 10^4$) | Mn ($\times 10^4$) | Mw/Mn |
|---|---|---|---|---|---|---|
|  | 1,4-cis | 1,4-trans | vinyl |  |  |  |
| Example 19 | 99.0 | 0.3 | 0.7 | 68.5 | 26.3 | 2.6 |
| Example 20 | 99.1 | 0.5 | 0.4 | 78.4 | 29.2 | 2.7 |
| Example 21 | 99.1 | 0.5 | 0.4 | 56.7 | 22.7 | 2.5 |
| Example 22 | 99.0 | 0.4 | 0.6 | 67.8 | 25.4 | 2.7 |
| Example 23 | 99.1 | 0.2 | 0.7 | 111.6 | 36.1 | 3.1 |
| Example 24 | 99.3 | 0.4 | 0.3 | — | — | — |
| Example 25 | 99.4 | 0.2 | 0.4 | 59.9 | 24.5 | 2.4 |
| Example 26 | 99.7 | 0.1 | 0.2 | 34.0 | 15.6 | 2.2 |
| Example 27 | 99.5 | 0.2 | 0.3 | 44.1 | 17.4 | 2.5 |
| Example 28 | 99.6 | 0.1 | 0.3 | — | — | — |
| Comparative Example 2 | 97.2 | 2.1 | 0.7 | 98.2 | 26.5 | 3.7 |
| Comparative Example 3 | 90.4 | 7.1 | 2.5 | 5.4 | 2.2 | 2.5 |
| Comparative Example 4 | 98.9 | 0.7 | 0.4 | — | — | — |

The invention claimed is:

1. A process for producing a conjugated diene polymer, comprising promoting polymerization at −10 to 30° C. in the presence of a catalyst consisting of (A) an yttrium compound represented by (1) a general formula ayindicated below, (B) an ionic compound consisting of a non-coordinating anion and a cation, and (C) an organoaluminum compound:

[Chemical Formula 1]

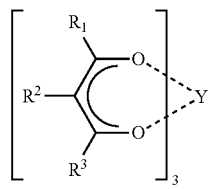

(where $R^1$, $R^2$, and $R^3$ represent hydrogen or a substituent group with 1 to 12 carbon atom/s, and Y represents an yttrium atom).

2. A process for producing a conjugated diene polymer, comprising using a catalyst consisting of (A) an yttrium compound represented by a general formula (2) indicated below, (B) an ionic compound consisting of a non-coordinating anion and a cation, and (C) an organoaluminum hydride compound, wherein a molar ratio (C)/(A) between (C) and (A) is 5 to 50:

[Chemical Formula 2]

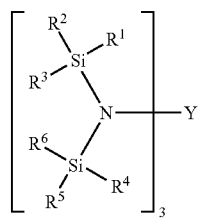

(where $R^1$ to $R^6$ represent hydrogen or a substituent group with 1 to 12 carbon atom/s, and Y represents an yttrium atom).

3. The process for producing a conjugated diene polymer according to claim 1, wherein the conjugated diene polymer is a polybutadiene which contains cis-1,4 structures at a ratio of 99% or higher.

4. A catalyst for producing a conjugated diene polymer, the catalyst consisting of (A) an yttrium compound represented by a general formula (2) indicated below, (B) an ionic compound consisting of a non-coordinating anion and a cation, and (C) an organoaluminum hydride compound, wherein a molar ratio (C)/(A) between (C) and (A) is 5 to 50:

[Chemical Formula 3]

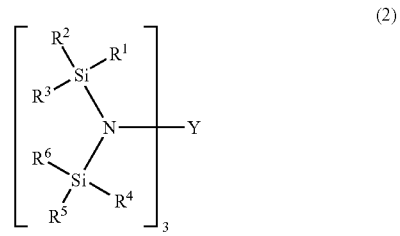

(where $R^1$ to $R^6$ represent hydrogen or a substituent group with 1 to 12 carbon atom/s, and Y represents an yttrium atom).

5. The catalyst for producing a conjugated diene polymer according to claim 4, wherein the organoaluminum hydride compound is diethyl aluminum hydride.

6. The catalyst for producing a conjugated diene polymer according to claim 4, wherein the conjugated diene polymer is a polybutadiene which contains cis-1,4 structures at a ratio of 99% or higher.

7. The process for producing a conjugated diene polymer according to claim 2, wherein the conjugated diene polymer is a polybutadiene which contains cis-1,4 structures at a ratio of 99% or higher.

8. The catalyst for producing a conjugated diene polymer according to claim 5, wherein the conjugated diene polymer is a polybutaliene which contains cis-1,4 structures at a ratio of 99% or higher.

* * * * *